Sept. 12, 1967  S. FATOURAS  3,341,153

RUDDERLESS JET AIRCRAFT

Filed Jan. 13, 1965

United States Patent Office 3,341,153
Patented Sept. 12, 1967

3,341,153
RUDDERLESS JET AIRCRAFT
Sam Fatouras, The Surfside, 955 Foster Ave.,
Chicago, Ill. 60640
Filed Jan. 13, 1965, Ser. No. 425,286
1 Claim. (Cl. 244—52)

This invention relates to jet propulsion aircraft, and more particularly to a jet powered aircraft having no movable controlled surfaces.

It is an object of the present invention to provide a rudderless jet aircraft which will have cockpit control means for varying the angle of thrust.

Another object of the present invention is to provide a rudderless jet aircraft which will have a pivotable hollow sphere and tailpipe combination to control the flight of the aircraft along the three well known axes of the aircraft.

A further object of the present invention is to provide a rudderless jet aircraft which will have a plurality of jet engines and controllable nozzles to effectively control the aircraft in all types of aerial maneuvers.

Other objects of the invention are to provide a rudderless jet aircraft bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which.

Figure 1:
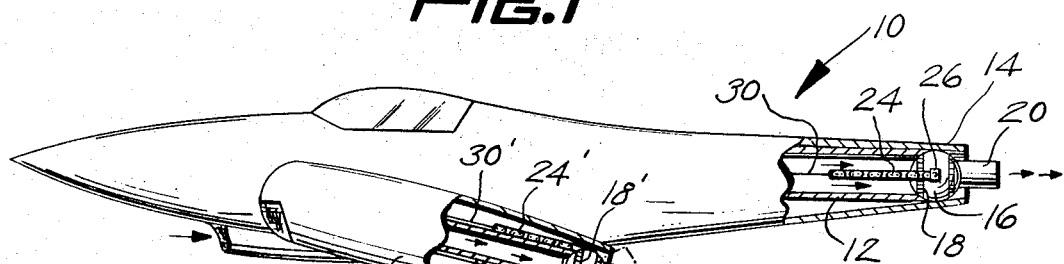
FIGURE 1 is a side view of the present invention shown in elevation and partly broken away.
Figure 2:
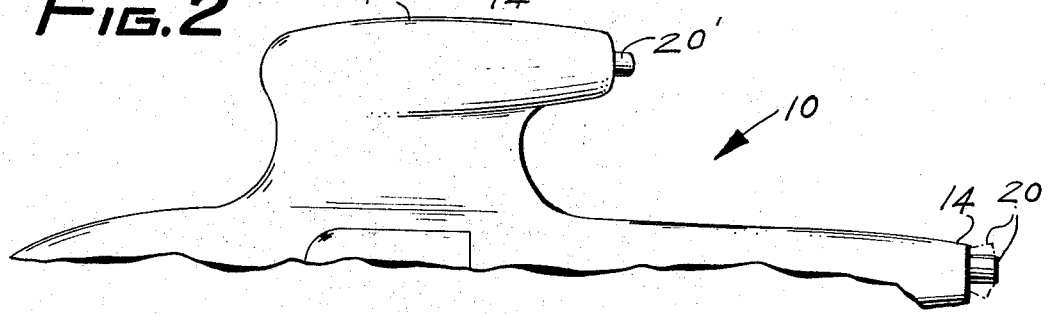
FIGURE 2 is a fragmentary top plan view of FIGURE 1.
Figure 3:
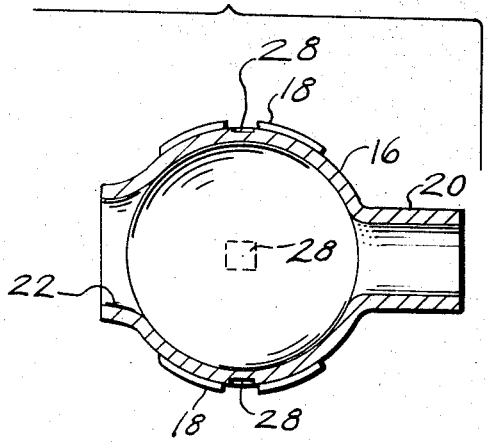
FIGURE 3 is a side view of one of the sphere members shown removed from the invention and shown in section.
Figure 4:
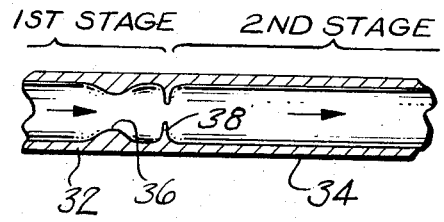
FIGURE 4 is a horizontal view showing a section through the first and second stages of the jet engines.

Referring now more in detail to the drawing, a rudderless jet aircraft 10 made in accordance with the present invention is shown to include a main jet sleeve 12 which is secured within the tail 14 of aircraft 10. The end of main jet sleeve 12 engages with a hollow sphere 16 which is provided with a pair of cage members 18 which allow the sphere 16 to rotate in order that the tailpipe 20 attached to sphere 16 may vary its angle within the opening of tail 14. An opening 22 of sphere 16 provides entrance means for the exhaust gases exiting from main jet sleeve 12. A pair of spaced apart link chains 24 are secured at one end to clamps 26 which are pivotably received within openings 28 of sphere 16, and the other end of link chains 24 are secured to cables 30 which extend through aircraft 10 to the cockpit area to provide control means for the angle of tailpipe 20 through well known linkage and lever means (not shown). As shown in FIGURE 3, the cage members 18 are spaced sufficiently apart to allow movement therebetween for the clamp 26 into different positions without interference with the members 18 as the sphere 16 is rotated within the supporting members 18. As is farther shown in FIGURE 1, the cables 30 and link chains 24 are disposed inside conduit 12. Main jet sleeve 12 is composed of a first stage area 32 forwardly of a second stage area 34, and the interior of first stage 32 and second stage 34 is provided with a venturi 36 and 38 respectively causing a build up in gas pressure forwardly within main jet sleeve 12. A pair of angularly positioned nacelles 40 on either side of aircraft 10 are provided with an internal jet sleeve 12' which are secured within tails 14' of nacelles 40. A hollow sphere 16' having cages 18' is provided with an extending tailpipe 20' and an opening 22' allowing for the exhaust gases to escape through the sphere 16'. A pair of link chains 24' are secured by clamps 26' to spheres 16', and the other ends of link chains 24' are secured to control cables 30' which are received in a well known manner by pulleys and linkages (not shown) in order to control the angles of tail pipes 20' from the cockpits of aircraft 10.

In operation, tailpipes 20 and 20' of aircraft 10 provide forward thrust for aircraft 10 and further serve to lift aircraft 10 as well as to climb and dive aircraft 10 as desired. In order for aircraft 10 to climb, the tailpipes 20 and 20' are simultaneously rotated in a downward direction toward the ground by means of cables 30 and 30' respectively. In executing a diving maneuver, tailpipes 20 and 20' are rotated in the opposite direction than that heretofore described. To execute a turn with the proper degree of bank, tailpipes 20 and 20' are operated simultaneously, and the pilot, by watching his turn and bank indicator within the cockpit, may execute the turn and bank or other maneuver by coordinating the angles of tailpipes 20 and 20'.

It shall be recognized that the jets or engines of aircraft 10 are provided with air scoop forward means to provide the necessary oxygen for proper burning of the fuel.

It shall further be recognized that various methods of control linkage may be employed within the structure of aircraft 10 to effectively pivot the tailpipes 20 and 20' to control the flight of aircraft 10.

While various changes may be made in the detail construction, it shall be understood that such changes shall be within the spirit and scope of the present invention as defined by the appended claim.

What I claim as new and desire to protect by Letters Patent of the United States is:

In a rudderless jet aircraft comprising, in combination, an aircraft having a plurality of jet engines, one of said jet engines being located within the tail of said aircraft, each of the other of said jet engines being located within a nacelle on either side of said aircraft, each of said jet engines having a rearward extending jet sleeve, the rear end of each of said jet sleeves having a plurality of cage members, a hollow sphere supported between said cage members, said cage members defining a support for retaining rotatably free said sphere, said sphere having a first opening at one end in communication with the interior of said jet sleeve, said jet sleeve being comprised of a first and second stage area, said first stage area being located forward of said second stage area, a venturi at the rear of each of said stage areas, said first opening being adjacent said venturi at the rear of said second stage, a second opening on said sphere, said second opening being diametrically opposite said first opening and communicating with one end of a tail pipe integrally secured to said sphere, said tailpipe comprising a cylindrical element having an opening at its opposite end for escape of exhaust gases from said jet engine, and control means for rotating said sphere relative to said cage members, said control means comprising a pair of clamps received within a set of openings in said sphere, one end of a link chain secured to each of said clamps, a cable secured at one end of the opposite end of each of said link chains, the opposite ends of said cables extending to a pilot's cockpit on said aircraft.

References Cited

UNITED STATES PATENTS

| | | | |
|---|---|---|---|
| 2,868,478 | 1/1959 | McCloughy | 244—52 |
| 3,066,484 | 12/1962 | Buchanan et al. | 60—35.6 |

FOREIGN PATENTS

| | | | |
|---|---|---|---|
| 3,188,025 | 6/1963 | Moorehead | 244—55 |
| 420,549 | 11/1910 | France. | |
| 1,009,492 | 5/1957 | Germany. | |
| 600,397 | 4/1948 | Great Britain. | |

OTHER REFERENCES

Solid-Propellant Motors; Flight, Jan. 13, 1961, p. 42, (Copy in Group 450, 244—42.)

MILTON BUCHLER, *Primary Examiner.*

B. BELKIN, *Assistant Examiner.*